United States Patent
Osman et al.

(10) Patent No.: US 11,148,061 B2
(45) Date of Patent: Oct. 19, 2021

(54) SPECTATORS VOTE TO BENCH PLAYERS IN A VIDEO GAME

(71) Applicant: Sony Interactive Entertainment Inc., Tokyo (JP)

(72) Inventors: Steven Osman, San Mateo, CA (US); Katrine Chow, San Mateo, CA (US)

(73) Assignee: Sony Interactive Entertainment Inc., Toyko (JP)

( * ) Notice: Subject to any disclaimer, the term of this patent is extended or adjusted under 35 U.S.C. 154(b) by 100 days.

(21) Appl. No.: 16/744,086

(22) Filed: Jan. 15, 2020

(65) Prior Publication Data
US 2021/0213360 A1   Jul. 15, 2021

(51) Int. Cl.
A63F 13/75       (2014.01)
A63F 13/795      (2014.01)
A63F 13/537      (2014.01)

(52) U.S. Cl.
CPC .......... *A63F 13/795* (2014.09); *A63F 13/537* (2014.09)

(58) Field of Classification Search
CPC .......... A63F 13/87; A63F 13/75; A63F 13/35; A63F 13/70; A63F 13/798; A63F 13/79; A63F 13/795
USPC .......................................................... 463/31
See application file for complete search history.

(56) References Cited

U.S. PATENT DOCUMENTS

| | | | | |
|---|---|---|---|---|
| RE38,432 E * | 2/2004 | Fai | .......................... | G09B 5/065 273/432 |
| 8,001,003 B1 * | 8/2011 | Robinson | ........... | G06Q 30/0255 705/14.53 |
| 8,214,361 B1 * | 7/2012 | Sandler | ................. | G06F 16/951 707/732 |
| 8,620,723 B1 * | 12/2013 | Good | ..................... | G06Q 30/00 705/7.34 |
| 9,218,468 B1 * | 12/2015 | Rappaport | ............. | G06F 21/30 |
| 10,068,257 B1 * | 9/2018 | Mosthaf | ............ | G06Q 30/0631 |
| 2003/0236110 A1 * | 12/2003 | Beaulieu | ............. | G07F 17/3276 463/1 |
| 2007/0021058 A1 * | 1/2007 | Arseneau | .............. | G06F 1/1698 455/3.06 |
| 2008/0004116 A1 * | 1/2008 | Van Luchene | .......... | G07F 17/32 463/42 |
| 2008/0046222 A1 * | 2/2008 | Van Luchene | .......... | G07F 17/32 703/6 |
| 2011/0161423 A1 * | 6/2011 | Pratt | ...................... | G06Q 10/06 709/205 |
| 2012/0089554 A1 * | 4/2012 | Claxton | ................. | G06N 7/005 706/52 |
| 2016/0057084 A1 * | 2/2016 | Tan | ......................... | H04L 51/20 709/206 |
| 2016/0294762 A1 * | 10/2016 | Miller | ................. | H04L 65/4084 |

(Continued)

*Primary Examiner* — Michael A Cuff
(74) *Attorney, Agent, or Firm* — Penilla IP, APC

(57) ABSTRACT

A method for displaying a video game to spectators includes receiving votes from spectators to remove a player from a video game. The method also includes determining whether the number of votes received to remove the player from the video game meets a threshold level required to trigger removal of the player from the video game. If the number of votes received to remove the player from the video game meets the threshold level required to trigger removal of the player from the video game, the method includes generating a command configured to cause the player to be removed from the video game. The method also can include animating the removal of the player and providing visual cues to other players or spectators as to why the player was removed from the video game.

24 Claims, 5 Drawing Sheets

(56) References Cited

U.S. PATENT DOCUMENTS

| | | | | |
|---|---|---|---|---|
| 2017/0225079 A1* | 8/2017 | Conti | ...................... | A63F 13/87 |
| 2017/0352050 A1* | 12/2017 | Nixon | ................... | G06F 3/0482 |
| 2018/0250600 A1* | 9/2018 | Trombetta | .............. | A63F 13/46 |
| 2019/0262723 A1* | 8/2019 | Trombetta | .............. | A63F 13/35 |
| 2019/0262724 A1* | 8/2019 | Trombetta | .............. | A63F 13/86 |
| 2019/0371273 A1* | 12/2019 | Benedetto | ............. | A63F 13/497 |
| 2020/0167699 A1* | 5/2020 | Cohen | .................. | G06Q 20/045 |
| 2020/0269140 A1* | 8/2020 | Peterke | ................. | A63F 13/358 |
| 2020/0289946 A1* | 9/2020 | Thielbar | ................. | A63F 13/73 |
| 2021/0093969 A1* | 4/2021 | McCoy | ............... | A63F 13/5258 |

\* cited by examiner

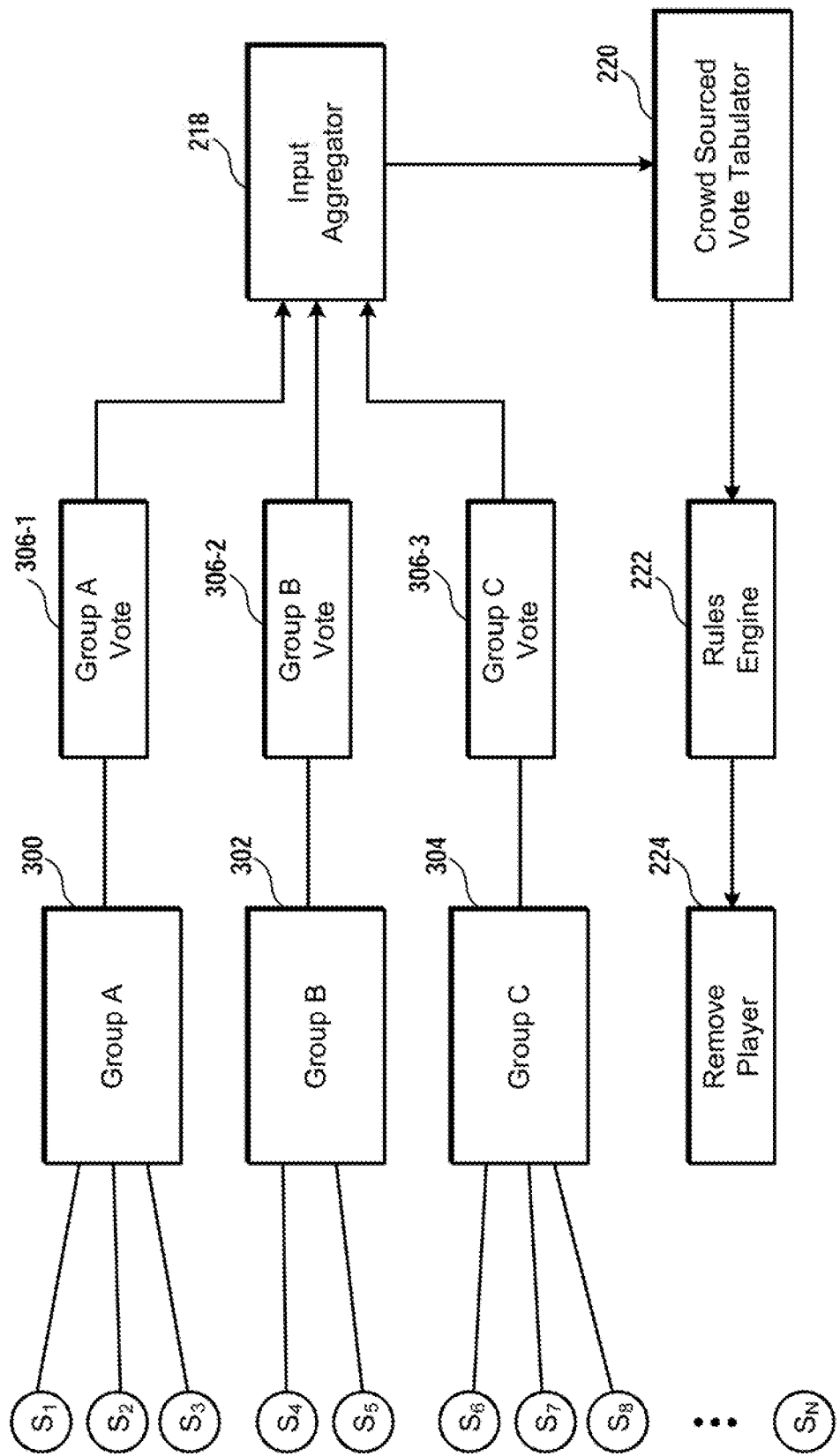

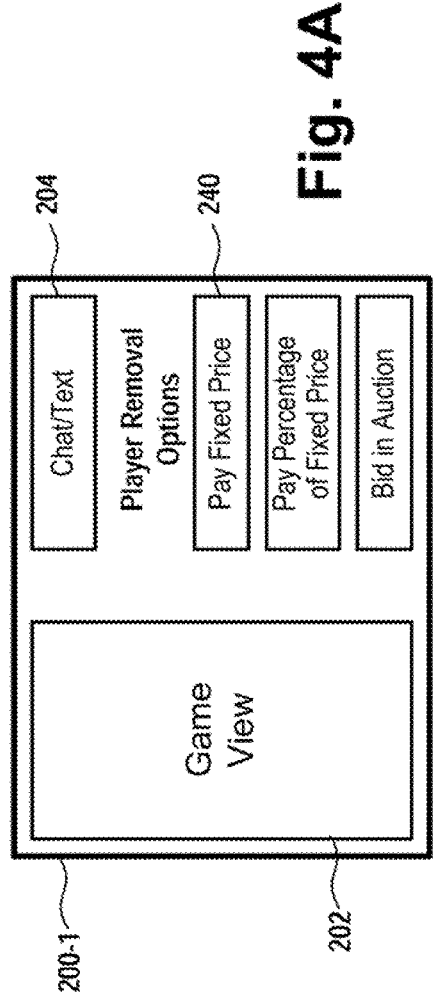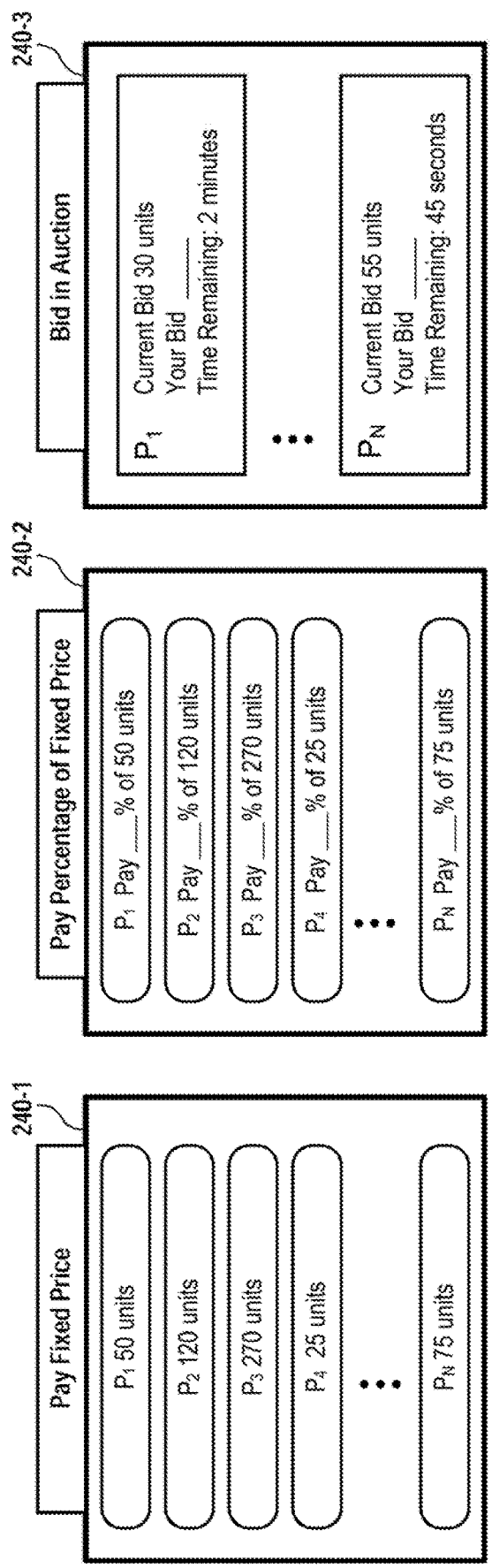

SPECTATORS VOTE TO BENCH PLAYERS IN A VIDEO GAME

BACKGROUND

Online platforms such as, for example, Twitch, have made it possible for spectators to stream live and recorded video of top video games and electronic sports ("esports") events. As more and more people have become interested in watching video games and esports events, game developers have sought to enhance the viewing experience by providing increased functionality and interactivity for spectators.

It is in this context that embodiments arise.

SUMMARY

In an example embodiment, a method for displaying a video game to spectators includes receiving votes from spectators to remove a player from a video game. The method also includes determining whether a number of votes received to remove the player from the video game meets a threshold level required to trigger removal of the player from the video game. And, if the number of votes received to remove the player from the video game meets the threshold level required to trigger removal of the player from the video game, the method further includes generating a command configured to cause the player to be removed from the video game.

In one embodiment, determining whether the number of votes received to remove the player from the video game meets the threshold level required to trigger removal of the player from the video game includes weighting a vote received from a spectator based on the skill level of the spectator in the video game. The skill level of the spectator is the level of skill reflected by metrics in the spectator's game profile for the video game. In one embodiment, the metrics in the spectator's game profile for the video game include one or more of how often the spectator plays the game, the spectator's game rating, the spectator's video game statistics, and the spectator's accomplishments in the video game. In one embodiment, a vote received from a spectator having a relatively high level of skill in the video game is accorded more weight than a vote received from a spectator having either an average level of skill in the video game or a relatively low level of skill in the video game.

In one embodiment, the threshold level of votes required to trigger removal of the player from the video game is 60% of an overall number of votes received regarding the player. In another embodiment, the threshold level of votes required to trigger removal of the player from the video game is 60% of an overall number of weighted votes received regarding the player.

In one embodiment, the command is transmitted to an online gaming system and the command instructs the online gaming system to remove the player from the video game without giving the player access to override the command. In another embodiment, the command is transmitted to an online gaming system and the command instructs the online gaming system to insert into the video game a game specific reenactment of a player substitution process that shows the player being removed from the video game.

In one embodiment, the command bypasses the controls of the player to be removed, so that input from the player is blocked. In another embodiment, the method further includes animating the removal of the player and providing visual cues to other players or spectators as to why the player was removed from the video game.

In another example embodiment, a method for processing input from spectators of a video game is provided. The video game is rendered by a cloud gaming system and streamed to one or more players during a session. The method includes enabling access to view the video game by one or more spectators that are remote from the one or more players, with each of the spectators being provided with an interface to enable providing of feedback to the cloud gaming system. The method also includes receiving feedback from one or more of the spectators, with the feedback including voting data that is used by the cloud gaming system, where the voting data is in regard to removal of one or more of the players. The method further includes processing the voting data against metrics set for determining when one of the players is to be removed from playing the video game, and removing one of the players from playing the video game when the cloud gaming system determines that a threshold has been met based on the metrics. The removal of the player is performed by the cloud gaming system without enabling the player to rejoin during the session.

In one embodiment, processing the voting data against metrics set for determining when of the players is to be removed from playing the video game includes weighting votes from spectators based on a skill level of the spectator in the video game, tabulating a percentage of overall weighted votes from spectators in favor of removing the player from the video game, and determining whether the percentage of overall weighted votes from spectators in favor of removing the player from the video game meets a threshold for removing the player from the video game. In one embodiment, the threshold for removing the player from the video game is 60% of the overall weighted votes from spectators in favor of removing the player from the video game.

In one embodiment, the method further includes assigning the player removed from the game to a different circle of players so that the player removed from the game can continue to play the game. In one embodiment, the different circle of players includes players having game-playing attributes similar to the game-playing attributes of the player removed from the game. In one embodiment, the game-playing attributes include griefing other players.

In one embodiment, when removing one of the players from playing the video game, the cloud gaming system inserts into the video game a game specific reenactment of a player substitution process that shows the player being removed from the video game.

In one embodiment, the interface to enable providing of feedback to the cloud gaming system enables spectators to pay to have a player removed from playing the video game. In one embodiment, the interface to enable providing of feedback to the cloud gaming system enables a spectator to pay in full a fixed price to have a player removed from playing the video game, and the removal of the player is performed by the cloud gaming system when payment in full of the fixed price is received from the spectator. In another embodiment, the interface to enable providing of feedback to the cloud gaming system enables a plurality of spectators to pay a part of a fixed price to have a player removed from playing the video game, and the removal of the player is performed by the cloud gaming system when combined payment in full of the fixed price is received from the plurality of spectators each of whom paid a part of the fixed price to have the player removed from playing the video game.

In one embodiment, the interface to enable providing of feedback to the cloud gaming system enables spectators to bid in an auction to have a player removed from playing the video game. In one embodiment, the interface to enable providing of feedback to the cloud gaming system enables spectators to send a custom message to a player playing in the video game. In one embodiment, the interface to enable providing of feedback to the cloud gaming system enables spectators to send a predefined warning to a player playing in the video game regarding the player's performance.

In yet another example embodiment, a computer readable medium containing non-transitory program instructions for processing input from spectators of a video game is provided. The video game is rendered by a cloud gaming system and streamed to one or more players during a session, and the execution of the program instructions by one or more processors of a computer system causes the one or more processors to carry out the operations of enabling access to view the video game by one or more spectators that are remote from the one or more players, with each of the spectators being provided with an interface to enable providing of feedback to the cloud gaming system, receiving feedback from one or more of the spectators, with the feedback including voting data that is used by the cloud gaming system, the voting data relating to the removal of one or more of the players, processing the voting data against metrics set for determining when one of the players is to be removed from playing the video game, and removing one of the players from playing the video game when the cloud gaming system determines that a threshold has been met based on the metrics, with the removal of the player being performed by the cloud gaming system without enabling the player to rejoin during the session.

Other aspects and advantages of the disclosures herein will become apparent from the following detailed description, taken in conjunction with the accompanying drawings, which illustrate by way of example the principles of the disclosures.

BRIEF DESCRIPTION OF THE DRAWINGS

FIG. 3 is a simplified schematic diagram that illustrates a process for removing a player from a game based on group voting by spectators, in accordance with one embodiment.

FIGS. 4A-4D show examples of player removal interfaces that enable a spectator to pay to remove a player from a game, in accordance with one embodiment.

DETAILED DESCRIPTION

Figure 1:
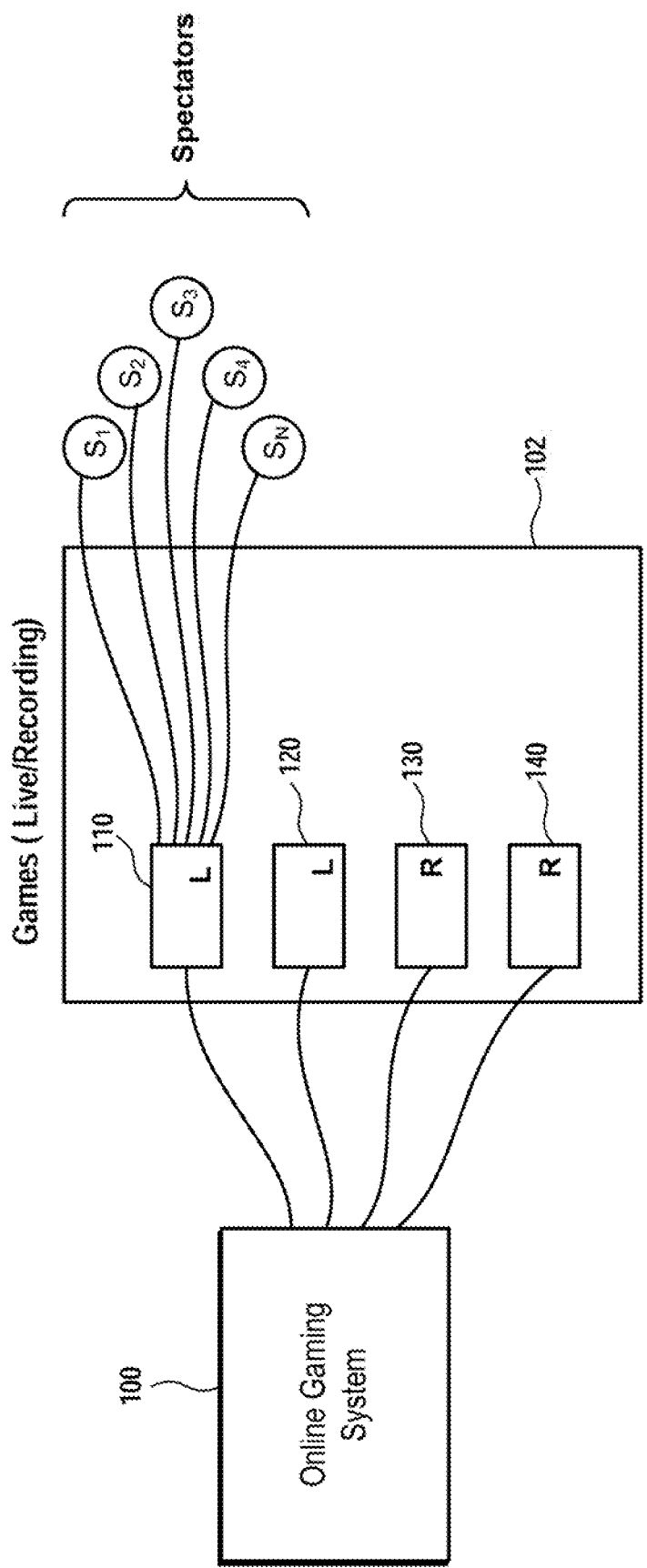
FIG. 1 is a simplified schematic diagram that illustrates the manner in which spectators can watch an online video game.

In the following description, numerous specific details are set forth in order to provide a thorough understanding of the example embodiments. However, it will be apparent to one skilled in the art that the example embodiments may be practiced without some of these specific details. In other instances, process operations and implementation details have not been described in detail, if already well known.

Embodiments of the present invention provide a method of displaying a video game to spectators. In particular, the embodiments described herein provide a voting interface that enables spectators to vote to remove players from the video game for bad behavior, e.g., poor sportsmanship, substandard performance in the video game, or simply because the spectator does want to watch a particular player play in the video game. By providing spectators with increased involvement in the video game, the popularity of the video game can be increased, which can lead to increased viewership for the video game and, in turn, more sponsorships for game play.

In the example embodiments described herein, references are made to the "removal" of a player from a video game, e.g., "vote to remove a player," "remove player from game," and "this player is being removed from the game." In some embodiments, the meaning of the term "removal" can vary in degree. By way of example, the "removal" of a player can include the temporary removal of the player from participating in current game action, e.g. benching the player, but not the permanent removal of the player from participating in the game, e.g., banning the player. In team gaming, some players are assembled in to teams, where the team tries to achieve a common goal. The common goal may be to score the most points, collect the most assets, or achieve a result. In some cases, the players may be assembled or grouped to play specific team sports, e.g., basketball, football, baseball, etc. In any one of these team gaming scenarios, some players may be viewed by spectators as playing poorly. The level of play is, in some cases subjective and in other cases objective. In accordance with the following examples, when spectators are viewing a gaming event or session, the spectators may vote to remove certain players from active gaming. As noted above, the removal can be from the game itself or can be just from the action presently occurring in the game. For instance, if the players of a group are trying to achieve a goal, the removed player may be replaced with a backup player who may have been waiting to play in the game. The removed player can either added to the queue of players waiting to play in the game or returned to active play after the goal is achieved. In some embodiments, where the game is a sporting event, the player that is voted to be removed may be benched for a period of time, e.g., until the player is voted back into the game. As far as prior game play is concerned, if a player is removed from a game for only a period of time, that player's contributions during active game play, e.g., points scored for the team or achievements made on behalf of the team, before being removed from the game will stand for the team. For example, in the case of basketball game, the player can be removed from the court and replaced with an alternate player, but upon being removed from the game, the player simply sits on the bench and any points that the player scored remain on the scoreboard. A player that is removed, therefore, may still be eligible to return to active game play and may still be considered to be part of the game. In other embodiments, removal can include full removal from the game, e.g., the player is banned from future participation in that game. Full removal can be triggered when a threshold of votes is received to remove the player from the game. In other embodiments, the player can be fully removed from the game if the player is abusive or intentionally fails to follow the rules of the game.

FIG. 1 is a simplified schematic diagram that illustrates the manner in which spectators can watch an online video game. As shown in FIG. 1, the online game is played on online gaming system 100. The online gaming system 100 can be any suitable online gaming system including, by way of example, a local gaming system, an online multiplayer gaming system, and a streaming (cloud gaming) gaming system. In a local gaming system, the game is loaded onto a game console via disc, cartridge, or digital download, and then executed locally by the game console for display on a screen, e.g., a TV, a computer monitor, etc.

An online multiplayer gaming system can be used to play, for example, massively multiplayer online games (MMOGs). In an online multiplayer gaming system, the game play is carried out by both the gaming consoles of each of the players and a game server in communication with each of the gaming consoles. The game server can be part of a gaming network, e.g., the PlayStation Network (PSN). The game can be loaded onto the game consoles of the players via disc, cartridge, or digital download. The game server, which is also executing an instance of the game, receives state data uploaded from each of the game consoles and transmits state data regarding the other players back to each of the game consoles. The state data regarding the other players includes, by way of example, background scenes, characters, character movements, game level, etc. This state data regarding the other players enables the game consoles of each of the players to reconstruct multiplayer game play including all players and to display the reconstructed multiplayer game play to the screen, e.g., TV, computer, tablet, etc., connected to the game consoles of each of the players.

In a streaming (cloud gaming) gaming system, the game is executed in the cloud by one or more game servers (e.g., a game server farm). The game servers can be part of a gaming network, e.g., PlayStation Network (PSN). The game servers receive inputs (e.g., button presses) from the users playing the game and send back video frames to be displayed on the screens of the users' devices, e.g., a TV, a computer, a tablet, a smartphone, etc. By way of example, when a user presses the "jump" button for a character, this input is uploaded to the game server and, typically within about 250 milliseconds, the game server sends back video frames showing the character jumping for display on the user's screen.

The games played on online gaming system 100 can be published to an online platform for sharing with spectators. The online platform, e.g., website, app, etc., can be any suitable platform for streaming live and recorded video over the internet. In one embodiment, the online platform is part of a gaming network, e.g., the PlayStation Network (PSN), which allows users, e.g., spectators, to login and watch live games as well as recordings of games (video on demand). In another embodiment, the online platform is video streaming service, e.g., Twitch, Mixer, etc., which typically allows users to watch live games as well as recordings of games (video on demand) without requiring that the users login.

With continuing reference to FIG. 1, spectators can access games to watch over the online platform via user interface 102 displayed on the user's client device, e.g., computer, tablet, smartphone, etc. The user interface 102 typically displays a plurality of offerings to users including both live games and recordings of games that have already been completed (past games). The offerings can be displayed on the user interface 102 in the form of video thumbnails. As shown in FIG. 1, video thumbnails 110 and 120 are live games, as indicated by the "L" in the thumbnails, and video thumbnails 130 and 140 are recordings of past games, as indicated by the "R" in the thumbnails. Spectators can access a game to watch by clicking on one of the video thumbnails. As shown in FIG. 1, a plurality of spectators $S_1$, $S_2$, $S_3$, $S_4$, . . . $S_N$ have clicked on the video thumbnail 110 and are watching the live feed of the game associated with that thumbnail.

In the case of live games from either an online multiplayer system or a cloud gaming system, the live feed from the server (or servers) might be split into two, with one feed being sent to the players and the other feed being sent to the spectators. The feed that is sent to the players can be relatively highly compressed so that the feed reaches the players quickly. On the other hand, the feed that is sent to the spectators can be sent to a delay buffer, which delays the feed for a desired period of time, e.g., 2 seconds, 5 seconds, 7 seconds, etc. This delay prevents players from receiving improper assistance from others, e.g., spectators watching the spectator feed, during live game play. Moreover, because the feed sent to the spectators does not have to be compressed to increase transmission speed as much as the feed being sent to the players, a higher quality video feed can be sent to the spectators. In some embodiments, there can be peer-to-peer communication and all or some of this communication can be sent via backchannel (asynchronously) to the server.

Figure 2:
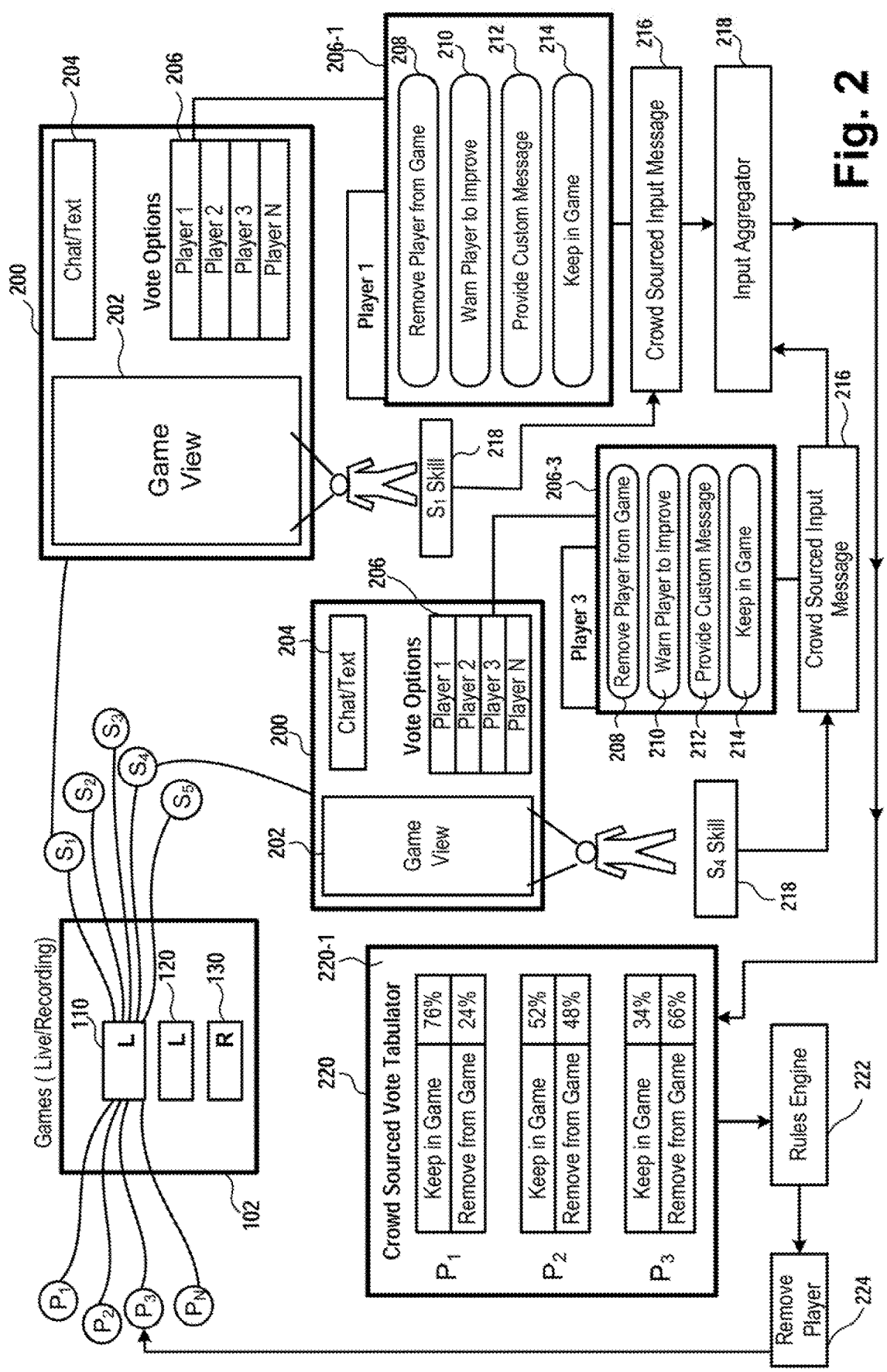
FIG. 2 is a simplified schematic diagram that illustrates a spectator voting interface and process for removing a player from a game, in accordance with one embodiment.

FIG. 2 is a simplified schematic diagram that illustrates a spectator voting interface and process for removing a player from a game, in accordance with one embodiment. As shown in FIG. 2, a number of spectators, $S_1$, $S_2$, $S_3$, $S_4$, and $S_5$, have clicked on the video thumbnail 110 displayed on user interface 102 and are watching the live game associated with that thumbnail. The live game can be a sports video game, e.g., a football game (e.g., Madden), a soccer game (e.g., FIFA series), a basketball game (e.g., NBA 2K), etc., or any other video game in which teams can compete against one another, e.g., League of Legends, Call of Duty, Dota 2, etc. As shown in FIG. 2, spectator $S_1$ is watching a live game via user interface 200 displayed on spectator $S_1$'s client device, e.g., a computer, tablet, smartphone, etc. The user interface 200 includes a game view 202, a communication channel 204, and a voting interface 206. The game view 202 displays the video of the game, which in this example is a live basketball game. Communication channel 204 provides the functionality required for a spectator to communicate, e.g., chat, text, etc., with other spectators watching the game and, in the case of live games, players participating in the game, provided the spectator has the access information (e.g., chat handle, cell number, etc.) needed to communicate with the player.

Voting interface 206 enables a spectator to cast a vote to, for example, remove a player from the game, or to send a message to a player in the game. The voting interface 206 displays a list of players in the game. In one embodiment, the list is a complete list that includes all of the players in the game. In another embodiment, the list is a partial list that includes some of the players in the game. As shown in FIG. 2, the voting interface 206 includes graphical buttons that enable the spectator to select any of the players in the game, e.g., Player 1, Player 2, Player 3, . . . Player N. To cast a vote regarding a particular player, e.g., Player 1, the spectator can click on the graphical button labeled "Player 1" to cause a player voting interface 206-1 for Player 1 to be displayed. As shown in FIG. 2, the player voting interface 206-1 for Player 1 includes graphical buttons 208, 210, 212, and 214. Graphical button 208, which is labeled "Remove Player from Game," enables the spectator to cast a vote to remove Player 1 from the game. By way of example, the spectator might want to have Player 1 removed from the game because of either poor performance in the game (e.g., poor fundamentals such as ball handling and shooting) or bad behavior (e.g., poor sportsmanship).

Graphical button 210, which is labeled "Warn Player to Improve," enables the spectator to send a warning to Player 1 to improve his performance or risk being removed from the game. In one embodiment, when the spectator clicks on graphical button 210, a general warning, e.g., "Improve your level of performance," is sent to Player 1. In another embodiment, when the spectator clicks on graphical button 210, an interface is displayed that enables the spectator either to select a general warning or to generate a more specific warning, e.g., "Start passing more and stop taking so many jump shots." In one embodiment, the specific warning is generated by inserting text in a graphical control element, e.g., a text box.

Graphical button 212, which is labeled "Provide Custom Message," enables the spectator to send a custom message to Player 1. By way of example, the custom message can be a compliment for the player, e.g., "Nice game today" or "You shoot the ball really well," or constructive criticism for the player, e.g., "You need to work on your jump shot." In one embodiment, when the spectator clicks on graphical button 212, an interface is displayed that enables the spectator to generate the custom message by inserting text in a graphical control element, e.g., a text box.

Graphical button 214, which is labeled "Keep in Game," enables the spectator to cast a vote to keep Player 1 in the game. By way of example, the spectator might want to vote for Player 1 to stay in the game because the spectator likes the way Player 1 plays the game. Alternatively, the spectator might want to vote to keep Player 1 in the game to prevent other spectators from getting enough votes to have Player 1 removed from the game, as will explained in more detail below.

The input received through voting interface 206 is transmitted to be processed into a crowd sourced input message 216. In the case of votes either to keep a player in the game or to remove a player from the game, in one embodiment, each vote is weighted in accordance with the skill level of the person casting the vote. For example, when spectator $S_1$ casts a vote, spectator $S_1$'s skill level 218 is included in the processing used to generate crowd sourced input message 216. A person's skill level 218 reflects the history of the person with respect to the particular game being played. By way of example, if spectator $S_1$ is watching a basketball game and casts a vote regarding a player, spectator $S_1$'s vote would be weighted based on the skill reflected by metrics in spectator $S_1$'s game profile for the basketball game. By way of example, the metrics in a spectator's game profile that can be included in assessing the level of skill can include how often a person plays the game, the person's game statistics (e.g., points, goals, assists, etc.), the person's game rating, and the accomplishments of the person in the game (e.g., levels achieved, trophies won, etc.).

In one embodiment, votes by spectators having relatively high skill levels in a game are given more weight than votes by spectators having relatively low skill levels in the game. This makes it more difficult for spectators having relatively low skill levels in a game to unduly influence whether players are either kept in or removed from the game. In one embodiment, votes by spectators having a relatively low skill level are counted once (no extra weight given), votes by spectators having an average level of skill are counted several times (e.g., 2× or 3×), and votes by spectators having a relatively high level of skill are counted many times (e.g., 5× or 10× or even higher). Thus, if spectator $S_1$ is watching a basketball game and spectator $S_1$'s skill level 218 indicates that spectator $S_1$ has a relatively high skill level in the basketball game, spectator $S_1$'s vote to remove a player from the basketball game would be given, in one embodiment, ten times more weight than a vote from a spectator having a relatively low skill level in the basketball game.

As shown in FIG. 2, spectator $S_4$ is also watching the live game via user interface 200 displayed on spectator $S_4$'s client device, e.g., a computer, tablet, smartphone, etc. As discussed above with reference to spectator $S_1$, the user interface 200 includes the game view 202, the communication channel 202, and the voting interface 206. As shown in FIG. 2, spectator $S_4$ has clicked on the graphical button labeled "Player 3" in the voting interface 206 to cause a player voting interface 206-3 for Player 3 to be displayed. The player voting interface 206-3 for Player 3 includes the same graphical buttons described above with reference to player voting interface 206-1 for Player 1, namely, graphical buttons 208 ("Remove Player from Game"), 210 ("Warn Player to Improve"), 212 ("Provide Custom Message"), and 214 ("Keep in Game"). Although not shown in FIG. 2, when a spectator clicks on the graphical button in voting interface 206 for one of the other players in the game, e.g., Player 2, Player 4, . . . Player N, a similar player voting interface is displayed for that player.

As described above with reference to spectator $S_1$, when spectator $S_4$ casts a vote, spectator $S_4$'s skill level 218 is included in the processing used to generate crowd sourced input message 216. Thus, if spectator $S_4$ is watching a basketball game and spectator $S_4$'s skill level 218 indicates that spectator $S_4$ has an average skill level in the basketball game, spectator $S_4$'s vote to remove a player from the basketball game would be given, in one embodiment, three times more weight than a vote from a spectator having a relatively low skill level in the basketball game.

The crowd sourced input messages 216 are transmitted to input aggregator 218 for further processing. As shown in FIG. 2, the crowd sourced input messages 216 from spectator $S_1$ and spectator $S_4$ are transmitted to input aggregator 218. The input aggregator 218 collects the crowd sourced input messages 216 received from the spectators and processes them as needed. In the case of votes either to remove a player from a game or to keep a player in the game, the input aggregator 218 transmits these votes to crowd sourced vote tabulator 220 for further processing, as will be explained in more detail below. In the case of messages to be sent to players in the game, e.g., a general warning or a custom message, the input aggregator 218 performs the functionality required to forward each message to the player for which the message is intended.

The crowd sourced vote tabulator 220 tallies the votes received from the input aggregator 218 and displays the voting results for each player via a suitable user interface 220-1. As shown in FIG. 2, the voting results for Player 1 are "Keep in Game" 76%, "Remove from Game" 24%. The voting results for Player 2 are "Keep in Game" 52%, "Remove from Game" 48%. The voting results for Player 3 are "Keep in Game" 34%, "Remove from Game" 66%. Once the crowd sourced vote tabulator 220 has tallied the votes and displayed the voting results, the crowd sourced vote tabulator 220 transmits the voting results to rules engine 222 for further processing to determine whether any players should be removed from the game based on the voting results.

The rules engine 222 applies a set of rules to the voting results for each player to determine whether the player should be removed from the game. By way of example, the set of rules can include rules regarding the percentage of votes required to automatically remove a player from a game, the minimum number of spectators that must vote before a player can be removed from a game, etc. In one embodiment, the threshold percentage of votes required to automatically remove a player from a game is 60%. Thus, any player for which at least 60% of the overall weighted spectator votes are in favor of the player's removal will be automatically removed from the game. As described above, the spectator votes can be weighted based on the skill level of each spectator. Thus, in this example, the weighting of the votes makes it possible for fewer than 60% of the total number of spectators to cast votes sufficient to meet the threshold required for automatic removal of a player. Those skilled in the art will appreciate that the threshold percentage of votes required to automatically remove a player from a game is not restricted to any specific value, e.g., 60%, but instead can be modified to meet the needs of particular situations.

In the case of more popular games which attract a relatively large number of spectators, e.g., hundreds or thousands of spectators, it may not be necessary to require that at least some minimum number of spectators must vote before a player can be removed from the game on the basis of the voting results. On the other hand, in the case of less popular games which attract only a relatively small number of spectators, e.g., fewer than a hundred spectators, fewer than fifty spectators, etc., it might be desirable to require that a minimum number of spectators vote to avoid allowing just a few people to have significant influence over the removal of a player. In one embodiment, at least five spectators must vote for a player to be removed before the player can be removed from a game. Those skilled in the art will appreciate that the minimum number of spectators that must vote to remove a player from a game is not restricted to any specific value, e.g., five, but instead can be modified to meet the needs of particular situations.

To demonstrate how the rules engine 222 functions, consider the example in which the spectator voting results are as shown in crowd sourced vote tabulator 220 for Players 1, 2, and 3 and the applicable rules specify that any player receiving at least 60% of the votes in favor of removal is automatically removed from the game. As neither Player 1 (24% of votes for removal) nor Player 2 (48% of votes for removal) received 60% of the votes in favor of removal, the rules engine 222 would not trigger any action relative to either Player 1 or Player 2. On the other hand, as Player 3 received 66% of the votes in favor of removal, which exceeds the removal threshold of 60%, the rules engine 222 would automatically trigger action to have Player 3 removed from the game. In particular, the rules engine 222 issues a remove player command 224 that is transmitted to the online game system 100 (see FIG. 1) and instructs the online game system 100 to remove the player, e.g., Player 3, from the game without giving the player access to override the command. In one embodiment, the remove player command 224 bypasses the controls of the player to be removed, so that input from the player is blocked. As shown in FIG. 2, the arrow extending from remove player command 224 to P$_3$ (Player 3) indicates that this player is being removed from the game, e.g., the live game associated with video thumbnail 110 displayed on user interface 102, by the online game system 100. By preventing the player from overriding the command, e.g., by disabling any override functionality to which the player might have access, the remove player command 224 ensures that the player will be removed from the game, even if the player is not inclined to do so voluntarily.

In certain games, e.g, a basketball game, a soccer game, and a football game, player substitutions can be made only at certain times during the game. By way of example, in a basketball game, a player can be removed from the game only during a stoppage in play. Thus, in certain games, the remove player command 224 cannot be executed immediately. Instead, execution of the remove player command 224 must be delayed until a point in the game is reached at which player substitutions are appropriate. In one embodiment, the player removal command 224 is configured to cause the online game system 100 to insert into the video game a game specific reenactment of the player substitution process. By way of example, in the case of a basketball game, the player removal reenactment can include video that shows the coach instructing a player on the bench to report into the game, the bench player first reporting to the scorer's table and then, at the appropriate time, coming onto the court, and the player who was voted out of the game, e.g., Player 3, leaving the court and taking a seat on the bench. By inserting a suitable player removal reenactment into the video game, the removal of any player from the game on the basis of crowd sourced spectator votes appears to be part of the natural flow of the game. Those skilled in the art will appreciate that in addition to the above-described example for a basketball game, game specific player removal reenactments can be formulated for other video games, e.g., a soccer game, a football game, etc.

In one embodiment, the player removal reenactment includes animating the removal of the player and providing visual cues to other players or spectators as to why the player was removed from the video game. In this manner, players can be discouraged from engaging in conduct such as, for example, poor sportsmanship, poor game play, etc., that would lead spectators to vote in favor of the player being removed from the game. As set forth above, players that have been removed from a game are eligible to return to the game, unless they have been removed from the game for, e.g., engaging in abusive behavior or intentionally disregarding the rules of the game. In one embodiment, a player can return to active game play when the spectators vote in favor of the player returning to the game.

As set forth above, a player may be voted off and removed from active game play. In another embodiment, a player that is voted off may be placed in a group with other players having similar game-playing attributes. By way of example, if the player that was voted off was removed for directing unwanted actions toward other players, that player may be considered to be the type of player who routinely provides grief to other players. In multiplayer or team play environments, grief-giving players ("griefers") are often not appreciated and such players would be more likely to be voted off by spectators than more respectful players. Thus, players that are removed for engaging in grief-giving activity ("griefing") can be placed in or assigned to special groups or circles with other griefers. In this manner, players removed from a game can continue to play the game without adversely affecting the gaming environment for other players, e.g., more respectful players that do not engage in griefing. This essentially creates multiple spheres of gamers, with some who are griefers playing in one sphere and some who are honest, respectful players playing in another sphere. In one example, circles are created for multiple categories of players. This allows a player that acts in a certain way to be moved into a circle with other players that act in substantially the same way. In one example, a circle includes players that are not necessarily griefers. In other examples, circles can be made for other categories of players, e.g., aggressive players, expert players, beginner players, mid-level players, timid players, players with certain trophies or assets, etc. When players are not acting in accordance with what spectators expect for certain gaming environments, game events, or game actions, those players may be voted off and removed to specific circles of players that might be a better fit or that might make playing the game more enjoyable. The generation of circles and the assigning of removed players to different circles dynamically by way of spectator voting will allow all players to continue playing and enjoying their games, albeit within different circles of players.

FIG. 3 is a simplified schematic diagram that illustrates a process for removing a player from a game based on group voting by spectators, in accordance with one embodiment. As shown in FIG. 3, a plurality of spectators, $S_1$, $S_2$, $S_3$, ... $S_N$, are watching a game, e.g., as set forth above with reference to FIG. 1. During the game, spectators typically can talk to one another over an audio channel. In the case of popular games, which can attract hundreds and thousands of spectators, audio problems can occur when too many spectators try to share audio. To avoid such audio problems, the servers of the online platform sharing the game can use load balancing to divide the spectators into smaller groups. In addition, spectators can join together on their own, e.g., with friends, family, etc., to form a group that watches the game together. As shown in FIG. 3, spectators $S_1$, $S_2$, and $S_3$ are part of first group 300 ("Group A"), spectators $S_4$ and $S_5$ are part of second group 302 ("Group B"), and spectators $S_6$, $S_7$, and $S_8$ are part of third group 304 ("Group 3").

As the spectators watch the game, the members of each group can vote to have a player removed from the game, as described above with reference to FIG. 2. For each group, the individual member votes are transmitted to a group vote generator 306 for processing to determine the vote for the group. In one embodiment, in the course of determining the vote for the group, the vote of each member of the group is weighted based on the member's skill level in the game, as described above in more detail with reference to FIG. 2. Thus, in the case of Group A, if spectator $S_1$ has a relatively high skill level in the game and spectator $S_3$ has a relatively low skill level in the game, group vote generator 306-1 would give more weight to spectator $S_1$'s vote than to the spectator $S_3$'s vote.

In one embodiment, the group vote generator 306 analyzes the weighted member votes to have a player removed from the game on a player-by-player basis and generates a single group vote for each player for which a vote was cast. By way of example, if all of the members of Group A voted to have Player 3 removed from the game, the group vote generator 306-1 would determine that the Group A vote with regard to Player 3 is to have the player removed from the game. The group vote generator 306-1 transmits the group vote with regard to each player to the input aggregator 218 (see FIG. 2) for further processing, as will be described in more detail below.

In another example, if spectator $S_4$, who has a relatively high skill level in the game, votes to keep Player 2 in the game and spectator $S_5$, who has a relatively low skill level in the game, votes to have Player 2 removed from the game, the group vote generator 306-2 would determine that the Group B vote with regard to Player 2 is to keep the player in the game. The reason for this determination is that spectator $S_4$'s vote would be given more weight than spectator $S_5$'s vote because spectator $S_4$ has a higher skill level in the game.

With continuing reference to FIG. 3, the group vote generators 306-1, 306-2, and 306-3 transmit the group votes for Group A, Group, and Group C, respectively, to input aggregator 218. In one embodiment, the input aggregator 218 weights each group vote with regard to a player on the basis of the number of members in each group. By way of example, if the Group C vote with regard to Player 1 was to have the player removed from the game and the Group B vote with regard to Player 1 was to keep Player 1 in the game, the input aggregator would accord the Group C vote 50% more weight than the Group B vote because Group C has 3 members and Group B has 2 members. The group vote generators 306-1, 306-2, and 306-3 can transmit the number of members in the particular group to the input aggregator 218 at the same time the group vote with regard to a player is transmitted to the input aggregator 218 for processing.

The input aggregator 218 processes the group votes received from the group vote generators 306-1, 306-2, and 306-2 and transmits the group votes to crowd sourced vote tabulator 220 for further processing along the lines described above with reference to FIG. 2. In particular, the crowd sourced vote tabulator 220 tallies the group votes received from the input aggregator 218 and displays the voting results for each player. Once the crowd sourced vote tabulator 220 has tallied the group votes and displayed the voting results, the crowd sourced vote tabulator 220 transmits the voting results to rules engine 222 for further processing to determine whether any players should be removed from the game based on the voting results. As described above, the rules engine 222 applies a set of rules to the voting results for each player to determine whether the player should be removed from the game. In one embodiment, the rules engine 222 applies a set of rules tailored specifically for group voting results. By way of example, the set of rules for group voting results can include different voting thresholds for each group to trigger automatic removal a player from the game or can restrict the players for whom each group can vote to have removed from the game, e.g., Group A can vote to remove players from team 1, Group B can vote to remove players from team 2, etc. If the rules engine 222 determines that the group voting results mandate that a player be removed from the game, the rules engine 222 issues a remove player command 224. As described above with reference to FIG. 2, the remove player command 224 is transmitted to the online game system 100 (see FIG. 1) and instructs the online game system 100 to remove the player from the game without giving the player any opportunity to override the command.

FIGS. 4A-4D show examples of player removal interfaces that enable a spectator to pay to remove a player from a game, in accordance with one embodiment. In addition to voting to remove a player from a game, spectators can also pay to remove a player from a game. FIG. 4A shows a simplified user interface 200-1 that includes player removal interface 240, which lists several options a spectator has to pay to remove a player from the game. As shown in FIG. 4A, user interface 200-1 includes game view 202, a communication channel 204, and a player removal interface 240. The game view 202 and communication channel can be the same as described above with reference to FIG. 2. The player removal interface 240 lists the options a spectator has to pay to remove a player from a game. As shown in FIG. 4A, the player removal interface 240 includes graphical buttons labeled "Pay Fixed Price," "Pay Percentage of Fixed Price," and "Bid in Auction." To pay in full to have a player removed from the game, the spectator can click on the graphical button labeled "Pay Fixed Price" to cause a player removal interface 240-1 to be displayed. Additional details regarding the player removal interface 240-1 are set forth below with reference to FIG. 4B. To pay in part to have a player removed from the game, the spectator can click on the graphical button labeled "Pay Percentage of Fixed Price" to cause a player removal interface 240-2 to be displayed. Additional details regarding the player removal interface 240-2 are set forth below with reference to FIG. 4C. To participate in an auction to have a player removed from the game, the spectator can click on the graphical button labeled "Bid in Auction" to cause a player removal interface 240-3 to be displayed. Additional details regarding the player removal interface 240-3 are set forth below with reference to FIG. 4D.

FIG. 4B shows player removal interface 240-1 that enables a spectator to pay in full to have a player removed from a game, in accordance with one embodiment. The player removal interface 240-1 includes a plurality of graphical buttons, with each graphical button specifying a fixed price to have a certain player removed from the game. In one embodiment, the player removal interface 240-1 lists a fixed price for all of the players in the game. In another embodiment, the player removal interface 240-1 lists a fixed price for some of the players in the game. As shown in FIG. 4B, the player removal interface 240-1 specifies a fixed price for each of the players in the game, e.g., $P_1$, $P_2$, $P_3$, $P_4$, . . . $P_N$. For example, the fixed price for Player 1 ($P_1$) is 50 units, the fixed price for Player 2 ($P_2$) is 120 units, and the fixed price for Player 3($P_3$) is 270 units. To pay in full to have a player removed from the game, the spectator would click on the graphical button for the particular player, e.g., Player 3, and would be taken to a suitable payment interface, e.g, a web page, an app, etc., to pay the requisite amount, e.g., 270 units for Player 3. The payment can be made using any suitable electronic payment method, e.g., credit card, electronic funds transfer (EFT), cryptocurrency, in-game currency used in a gaming network, etc. Once the payment has been made, a remove player command 224 (see FIG. 2) can be transmitted to the online game system 100 (see FIG. 1). As discussed above with reference to FIG. 2, the remove player command 224 instructs the online game system 100 to remove the player, e.g., Player 3, from the game at an appropriate time in the game.

FIG. 4C shows player removal interface 240-2 that enables a spectator to pay in part to have a player removed from a game, in accordance with one embodiment. The player removal interface 240-2 includes a plurality of graphical control elements, with each graphical control element enabling a spectator to insert a desired percentage of a fixed price to have a certain player removed from the game. In one embodiment, the player removal interface 240-2 lists a fixed price for all of the players in the game. In another embodiment, the player removal interface 240-2 lists a fixed price for some of the players in the game. As shown in FIG. 4C, the player removal interface 240-2 specifies a fixed price for each of the players in the game, e.g., $P_1$, $P_2$, $P_3$, $P_4$, . . . $P_N$. For example, the fixed price for Player 1 ($P_1$) is 50 units, the fixed price for Player 2 ($P_2$) is 120 units, and the fixed price for Player 3($P_3$) is 270 units. To pay in part to have a player removed from the game, the spectator would insert the desired percentage of the fixed price, e.g., 1%, 5%, 10%, 50%, etc., in the graphical control element for the particular player, e.g., Player 3, and then click on the graphical control element to be taken a payment interface to pay the amount due, subject to the condition that the amount due is to be paid only if 100% of the fixed price is collected from spectators and the particular player is removed from the game.

In one embodiment, a counter is used to monitor the amount collected from spectators for each player and the current percentage of the fixed price that has been collected for each player can be displayed to the spectators to incentivize them to make payments as the amount collected for a player approaches 100% of the fixed price. Once the amount collected for a player reaches 100% of the fixed price, a remove player command 224 (see FIG. 2) can be transmitted to the online game system 100 (see FIG. 1). As discussed above with reference to FIG. 2, the remove player command 224 instructs the online game system 100 to remove the player, e.g., Player 3, from the game at an appropriate time in the game.

FIG. 4D shows player removal interface 240-3 that enables a spectator to participate in auction to have a player removed from a game, in accordance with one embodiment. The player removal interface 240-3 includes a plurality of graphical control elements, with each graphical control element enabling a spectator to bid in auction to have a certain player removed from the game. In one embodiment, the player removal interface 240-3 includes an auction for all of the players in the game. In another embodiment, the player removal interface 240-3 includes an auction for some of the players in the game. By way of example, as shown in FIG. 4D, the graphical control element regarding Player 1 ($P_1$) displays the basic information regarding the auction including the current bid and the time remaining in the auction. In one embodiment, the time remaining in the auction is correlated to the time remaining in the game. To bid in an auction for a particular player, the spectator would insert a bid in the graphical control element for the particular player, e.g., Player 1. In the case of Player 1, the bid would have to exceed the current bid of 30 units shown in FIG. 4D for Player 1. The auctions for each player can be conducted in accordance with known online auction techniques. Once the auction for a player concludes, the spectator with the winning bid can be charged for the amount of the winning bid in accordance with known auction techniques. In addition, a remove player command 224 (see FIG. 2) can be transmitted to the online game system 100 (see FIG. 1). As discussed above with reference to FIG. 2, the remove player command 224 instructs the online game system 100 to remove the player, e.g., Player 1, from the game at an appropriate time in the game.

In the example embodiments described herein, a voting interface is provided to spectators watching a video game so that the spectators can vote to have a player or players removed from playing the video game. In addition, interfaces for paying to remove a player from the video game by paying all or some of a fixed price or by bidding in an auction are provided. It will be apparent to those skilled in the art that the principles described herein are not restricted to having players removed from playing a video game. For example, a voting interface can be provided to enable spectators to vote have a player or players added to the video game. In particular, if a player were to be removed from the video game, at the end of the session a notice could be sent to the player to see whether the player has interest in rejoining the game. If the player responds to the notice expressing interest to rejoin the video game, the spectators could vote to decide whether the player should be allowed to rejoin the video game.

In another embodiment, machine learning can be used learn trends that are likely to cause a player to get voted off. When a player engages in one of the trends, the system could recommend the player as a candidate for being pulled from the game (e.g., removed from the game or placed into a different circle of gamers). In this manner, action could be taken regarding players flying under the radar and not yet noticed by spectators before any significant issues arise. By way of example, if a certain player is engaging in griefing activity relative to other players but this activity has not yet been noticed by the spectators, the system using machine learning can identify those actions and either flag the player or act to automatically remove the player from the game or move the player to a new circle of players. In one embodiment, a machine learning process may use image analysis and metadata processing to identify features to be used as inputs to a machine learning engine. The machine learning engine may use classifiers to identify the types of features and to understand what behavior is typically occurring by one or more of the players. A model can be built to learn over time what actions by players mean and how to classify the actions, e.g., as actions resembling those of a griefer, an expert, an aggressor, etc. This information can be made available to spectators so that the spectators can use this information to make voting decisions regarding the players. For example, if an interface identifies a certain player as either causing griefing or being likely to cause griefing, the spectators can watch the player and make decisions on whether to vote him or her off the game or to move the player to a different circle of players. In other embodiments, the system can automatically remove the player from the game responsive to either output from a machine learning model or inferences derived from the output.

Figure 5:
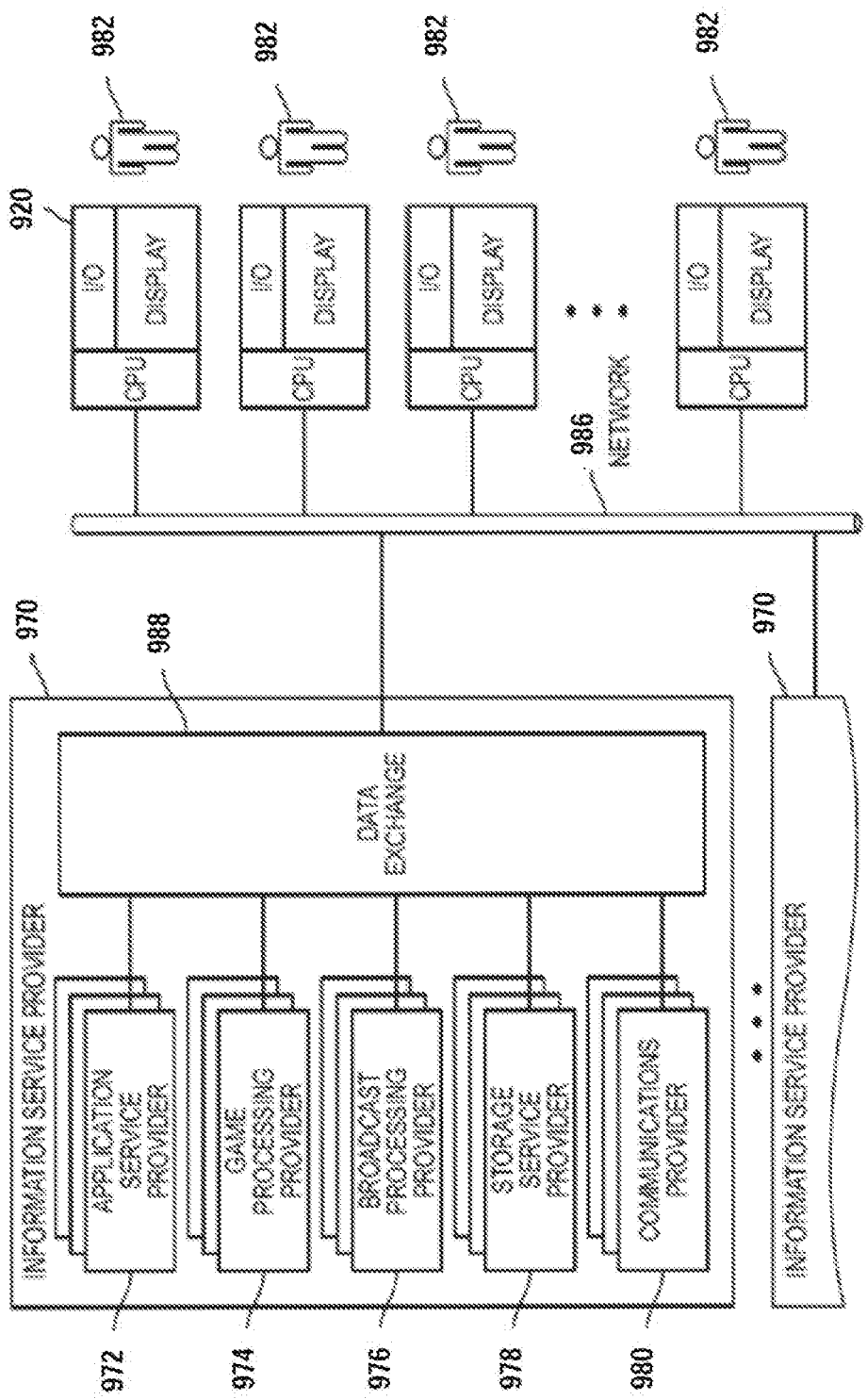
FIG. 5 illustrates an embodiment of an Information Service Provider architecture.

FIG. 5 illustrates an embodiment of an Information Service Provider architecture. Information Service Provider (ISP) 970 delivers a multitude of information services to users 982 geographically dispersed and connected via network 986. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 970 includes Application Service Provider (ASP) 972, which provides computer-based services to customers over a network (e.g., including by way of example without limitation, any wired or wireless network, LAN, WAN, WiFi, broadband, cable, fiber optic, satellite, cellular (e.g. 4G, 5G, etc.), the Internet, etc.). Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the internet (e.g., using servers, storage and logic), based on how the internet is depicted in computer network diagrams and is an abstraction for the complex infrastructure it conceals.

Further, ISP 970 includes a Game Processing Server (GPS) 974 which is used by game clients to play single and multiplayer video games. Most video games played over the internet operate via a connection to a game server. Typically, games use a dedicated server application that collects data from players and distributes it to other players. This requires a separate server to host the server application. In another embodiment, the GPS establishes communication between the players and their respective game-playing devices exchange information without relying on the centralized GPS. In yet another embodiment, the GPS can be used to distribute game copies to nodes via download and to facilitate a discovery process by which nodes can initiate a peer-to-peer connection with other nodes interested in playing a game in a serverless environment.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 976 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 978 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 980 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service Provider (NSP) which sells bandwidth or network access by providing direct backbone access to the Internet. Network service providers include telecommunications companies, data carriers, wireless communications providers, Internet service providers, cable television operators offering high-speed internet access, etc.

Data Exchange 988 interconnects the several modules inside ISP 970 and connects these modules to users 982 via network 986. Data Exchange 988 can cover a small area where all the modules of ISP 970 are in close proximity, or can cover a large geographic area when the different modules are geographically dispersed. For example, Data Exchange 988 can include a fast Gigabit Ethernet (or faster) within a cabinet of a data center, or an intercontinental virtual area network (VLAN).

Users 982 access the remote services with client device 920, which includes at least a CPU, a memory, a display and I/O. The client device can be a PC, a mobile phone, a netbook, tablet, gaming system, a PDA, etc. In one embodiment, ISP 970 recognizes the type of device used by the client and adjusts the communication method employed. In other cases, client devices use a standard communications method, such as HTML, to access ISP 970.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. Alternately, the computer readable code may be downloaded from a server using the data exchange interconnects described above. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although method operations may be described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Accordingly, the disclosure of the example embodiments is intended to be illustrative, but not limiting, of the scope of the disclosures, which are set forth in the following claims and their equivalents. Although example embodiments of the disclosures have been described in some detail for purposes of clarity of understanding, it will be apparent that certain changes and modifications can be practiced within the scope of the following claims. In the following claims, elements and/or steps do not imply any particular order of operation, unless explicitly stated in the claims or implicitly required by the disclosure.

What is claimed is:

1. A method for displaying a video game to spectators, comprising:
    receiving votes from spectators to remove a player from a video game;
    determining whether a number of votes received to remove the player from the video game meets a threshold level required to trigger removal of the player from the video game; and
    if the number of votes received to remove the player from the video game meets the threshold level required to trigger removal of the player from the video game, generating a command configured to cause the player to be removed from the video game.

2. The method of claim 1, wherein determining whether the number of votes received to remove the player from the video game meets the threshold level required to trigger removal of the player from the video game includes:
    weighting a vote received from a spectator based on a skill level of the spectator in the video game, the skill level is a level of skill reflected by metrics in a spectator's game profile for the video game.

3. The method of claim 2, wherein the metrics in a spectator's game profile for the video game include one or more of how often the spectator plays the game, the spectator's game rating, the spectator's video game statistics, and the spectator's accomplishments in the video game.

4. The method of claim 2, wherein a vote received from a spectator having a relatively high level of skill in the video game is accorded more weight than a vote received from a spectator having either an average level of skill in the video game or a relatively low level of skill in the video game.

5. The method of claim 1, wherein the threshold level of votes required to trigger removal of the player from the video game is 60% of an overall number of votes received regarding the player.

6. The method of claim 2, wherein the threshold level of votes required to trigger removal of the player from the video game is 60% of an overall number of weighted votes received regarding the player.

7. The method of claim 1, wherein the command is transmitted to an online gaming system and the command instructs the online gaming system to remove the player from the video game without giving the player access to override the command.

8. The method of claim 1, wherein the command is transmitted to an online gaming system and the command instructs the online gaming system to insert into the video game a game specific reenactment of a player substitution process that shows the player being removed from the video game.

9. The method of claim 1, wherein the command bypasses controls of the player to be removed, so that input from said player is blocked.

10. The method of claim 1, further comprising:
animating a removal of the player and providing visual cues to other players or spectators as to why the player was removed from the video game.

11. A method for processing input from spectators of a video game, the video game being rendered by a cloud gaming system and streamed to one or more players during a session, comprising:
enabling access to view the video game by one or more spectators that are remote from said one or more players, wherein each of the spectators is provided with an interface to enable providing of feedback to the cloud gaming system;
receiving feedback from one or more of the spectators, the feedback includes voting data that is used by the cloud gaming system, the voting data is in regard to removal of one or more of said players;
processing the voting data against metrics set for determining when one of said players is to be removed from playing the video game; and
removing one of said players from playing the video game when the cloud gaming system determines that a threshold has been met based on the metrics, the removal of said player is performed by the cloud gaming system without enabling the player to rejoin during the session.

12. The method of claim 11, wherein processing the voting data against metrics set for determining when of the players is to be removed from playing the video game includes weighting votes from spectators based on a skill level of the spectator in the video game, tabulating a percentage of overall weighted votes from spectators in favor of removing the player from the video game, and determining whether the percentage of overall weighted votes from spectators in favor of removing the player from the video game meets a threshold for removing the player from the video game.

13. The method of claim 12, wherein the threshold for removing the player from the video game is 60% of the overall weighted votes from spectators in favor of removing the player from the video game.

14. The method of claim 11, further comprising:
assigning the player removed from the game to a different circle of players so that the player removed from the game can continue to play the game.

15. The method of claim 14, wherein the different circle of players includes players having game-playing attributes similar to game-playing attributes of the player removed from the game.

16. The method of claim 15, wherein the game-playing attributes include griefing other players.

17. The method of claim 11, wherein, when removing one of the players from playing the video game, the cloud gaming system inserts into the video game a game specific reenactment of a player substitution process that shows the player being removed from the video game.

18. The method of claim 11, wherein the interface to enable providing of feedback to the cloud gaming system enables spectators to pay to have a player removed from playing the video game.

19. The method of claim 18, wherein the interface to enable providing of feedback to the cloud gaming system enables a spectator to pay in full a fixed price to have a player removed from playing the video game, and the removal of the player is performed by the cloud gaming system when payment in full of the fixed price is received from the spectator.

20. The method of claim 18, wherein the interface to enable providing of feedback to the cloud gaming system enables a plurality of spectators to pay a part of a fixed price to have a player removed from playing the video game, and the removal of the player is performed by the cloud gaming system when combined payment in full of the fixed price is received from the plurality of spectators each of whom paid a part of the fixed price to have the player removed from playing the video game.

21. The method of claim 11, wherein the interface to enable providing of feedback to the cloud gaming system enables spectators to bid in an auction to have a player removed from playing the video game.

22. The method of claim 11, wherein the interface to enable providing of feedback to the cloud gaming system enables spectators to send a custom message to a player playing in the video game.

23. The method of claim 11, wherein the interface to enable providing of feedback to the cloud gaming system enables spectators to send a predefined warning to a player playing in the video game regarding the player's performance.

24. A computer readable medium containing non-transitory program instructions for processing input from spectators of a video game, the video game being rendered by a cloud gaming system and streamed to one or more players during a session, wherein execution of the program instructions by one or more processors of a computer system causes the one or more processors to carry out the operations of:
enabling access to view the video game by one or more spectators that are remote from said one or more players, wherein each of the spectators is provided with an interface to enable providing of feedback to the cloud gaming system;
receiving feedback from one or more of the spectators, the feedback includes voting data that is used by the cloud gaming system, the voting data is in regard to removal of one or more of said players;
processing the voting data against metrics set for determining when one of said players is to be removed from playing the video game; and
removing one of said players from playing the video game when the cloud gaming system determines that a threshold has been met based on the metrics, the removal of said player is performed by the cloud gaming system without enabling the player to rejoin during the session.

* * * * *